US011706765B2

(12) United States Patent
Dartois et al.

(10) Patent No.: US 11,706,765 B2
(45) Date of Patent: Jul. 18, 2023

(54) MODIFYING A NUMBER OF UPLINK OR DOWNLINK INFORMATION STREAMS

(71) Applicant: Nokia Technologies Oy, Espoo (FI)

(72) Inventors: Luc Dartois, Carrieres sous Poissy (FR); Denis Rouffet, Boulogne Billancourt (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 8 days.

(21) Appl. No.: 16/757,011

(22) PCT Filed: Oct. 20, 2017

(86) PCT No.: PCT/EP2017/076929
§ 371 (c)(1),
(2) Date: Apr. 17, 2020

(87) PCT Pub. No.: WO2019/076470
PCT Pub. Date: Apr. 25, 2019

(65) Prior Publication Data
US 2020/0344746 A1 Oct. 29, 2020

(51) Int. Cl.
*H04W 72/04* (2023.01)
*H04W 72/21* (2023.01)
*H04B 7/0452* (2017.01)
*H04B 7/06* (2006.01)
*H04B 7/08* (2006.01)
*H04W 72/23* (2023.01)

(52) U.S. Cl.
CPC .......... *H04W 72/21* (2023.01); *H04B 7/0452* (2013.01); *H04B 7/0617* (2013.01); *H04B 7/086* (2013.01); *H04W 72/23* (2023.01)

(58) Field of Classification Search
CPC ............ H04W 72/0413; H04W 72/042; H04B 7/0452; H04B 7/0617; H04B 7/086
See application file for complete search history.

(56) References Cited

U.S. PATENT DOCUMENTS

2012/0218882 A1 8/2012 Ko et al.
2015/0381335 A1 12/2015 Khojastepour et al.
(Continued)

FOREIGN PATENT DOCUMENTS

CN 104618000 A 5/2015

OTHER PUBLICATIONS

Office action received for corresponding European Patent Application No. 17787189.4, dated Feb. 5, 2021, 4 pages.
(Continued)

*Primary Examiner* — John D Blanton
(74) *Attorney, Agent, or Firm* — Alston & Bird LLP (57) ABSTRACT

A method, in abase station of a wireless telecommunications system comprising multiple radiating elements, the method comprising modifying a number of uplink or downlink information streams, each information stream corresponding to an element in a space sampling basis for the system, wherein, in the downlink, the space sampling basis is configured so that the number of information streams is the same as the number of radiating elements of the system, and in the uplink, the space sampling basis is configured using a composite antenna derived from multiple radiating elements of the system to form a synthesised beam.

19 Claims, 7 Drawing Sheets

(56) References Cited

U.S. PATENT DOCUMENTS

| | | | |
|---|---|---|---|
| 2016/0323022 A1* | 11/2016 | Rahman | H04B 7/0639 |
| 2017/0238294 A1* | 8/2017 | Lim | H04B 7/0695 |
| | | | 370/277 |
| 2018/0103492 A1* | 4/2018 | Akkarakaran | H04W 72/046 |
| 2019/0260446 A1* | 8/2019 | Oteri | H04B 7/0695 |
| 2020/0187128 A1* | 6/2020 | Yao | H04W 52/367 |

OTHER PUBLICATIONS

International Search Report and Written Opinion received for corresponding Patent Cooperation Treaty Application No. PCT/EP2017/076929, dated Jul. 18, 2018, 13 pages.

Schellmann et al., "Spatial transmission mode switching inmulti-user MIMO-OFDM systems with user fairness", To appear in Transactions on Vehicular Technology, Dec. 31, 2009, pp. 1-13.

Zhang et al., "Frequency Synchronization for Massive MIMO Multi-User Uplink", IEEE Global Communications Conference (GlobeCom), Dec. 4-8, 2016, 6 pages.

Office Action for Chinese Application No. 201780096089.8 dated Aug. 4, 2021, 11 pages.

Office Action for Chinese Application No. 201780096089.8 dated Mar. 2, 2022, 10 pages.

Decision to Grant for Chinese Application No. 201780096089.8 dated Jul. 26, 2022, 4 pages.

Office Action for European Application No. 17787189.4 dated Jan. 11, 2023, 6 pages.

* cited by examiner

MODIFYING A NUMBER OF UPLINK OR DOWNLINK INFORMATION STREAMS

RELATED APPLICATION

This application claims priority to PCT Application No. PCT/EP2017/076929, filed on Oct. 20, 2017, each of which is incorporated herein by reference in its entirety.

TECHNICAL FIELD

Aspects relate, in general, to a method for modifying a number of uplink or downlink information streams in cellular base stations.

BACKGROUND

Network operators re-use their sites when going from one mobile generation to the next one, and new technologies use higher and higher frequencies to enable the high data rates that are expected. For example, 'new' allocations for 5G are being considered in the 3.5 GHz bands and above up to millimetre bands like 28 and 39 GHz. This implies, when addressing a mobile terminal with quasi omni directional antennas, that each composite antenna radiating surface should be kept almost the same between the old and new generations.

As an example, a B3 (1800 MHz) antenna composite is composed of, in general, 10 dipoles or patch elements. To get similar cell coverage, a 3.5 GHz antenna composite would need a larger gain due to worse propagation at higher frequencies with the same RF power and would therefore need a larger number of antenna elements—at least 53 to get similar antenna gain. However, this may not be sufficient, first because propagation is worst, second because bandwidth is significantly larger (×3 to ×5) and thirdly because the access used is TDD, so only ½ or ⅔ of the time is used for signal transmission. The general consequence is that the number of elements to get similar cell edge performance could rise up to be around 250. Also, because in higher bands power amplifier technologies worsen and can hardly deliver the same power, this has to be compensated for by higher antenna gain and this effect is reinforced when capacity is increased using multiple beams at the same time or in so called massive MIMO (mMIMO) systems that require more to balance the link budget by the antenna gain to support more users in the downlink from the same power budget or to better spatially separate co-scheduled users in the uplink.

In multiple beams systems, such as MIMO, massive MIMO or massive beam forming systems, signal processing is performed using all the antenna elements for both uplink and downlink communications by intelligently combining data for data streams. Consequently, increasing the number of elementary antennas increases the processing complexity by $O(n^2 \ln(n))$. Accordingly, the amounts of processing become very large.

SUMMARY

According to an example, there is provided a method, in a base station of a wireless telecommunications system comprising multiple radiating elements, the method comprising modifying a number of uplink or downlink information streams, each information stream corresponding to an element in a space sampling basis for the system, wherein, in the downlink, the space sampling basis is configured so that the number of information streams is the same as the number of radiating elements of the system, and in the uplink, the space sampling basis is configured using a composite antenna derived from multiple radiating elements of the system to form a synthesised beam. The synthesised beam can be matched to an uplink space channel size for a user equipment, UE, whereby to enable decomposition of an uplink signal from the UE using the synthesised beam. Multiple synthesised beams can be formed. The number of synthesised beams can match the number of uplink UEs served by the system. Uplink signal processing can be instantiated per synthesised beam. The space between two beams can be smaller than half the channel angular spreading. The system can be a Multiple-Input Multiple-Output, MIMO system or massive MIMO system.

According to an example, there is provided a base station of a wireless telecommunications system, the base station including an antenna comprising multiple radiating elements and a processing chain configured to supply a signal to, in the downlink, or receive a signal from, in the uplink, respective ones of the radiating elements, wherein the processing chain is configured to modify a number of uplink or downlink information streams, each information stream corresponding to an element in a space sampling basis for the system, by in the downlink, configuring the space sampling basis to use a radiating element for each information stream, and in the uplink, configuring the space sampling basis to provide a composite antenna derived from multiple radiating elements of the system to form a synthesised beam. The processing chain can match the synthesised beam to an uplink space channel size for a user equipment, UE, whereby to enable decomposition of an uplink signal from the UE using the synthesised beam. The processing chain can form multiple synthesised beams.

According to an example, there is provided apparatus comprising an antenna comprising multiple radiating elements, the apparatus further comprising means to supply a signal to, in the downlink, or receive a signal from, in the uplink, respective ones of the radiating elements, means to modify a number of uplink or downlink information streams, each information stream corresponding to an element in a space sampling basis, by, in the downlink, configuring the space sampling basis to use a radiating element for each information stream, and, in the uplink, configuring the space sampling basis to provide a composite antenna derived from multiple radiating elements to form a synthesised beam.

The apparatus can further comprise means to match the number of synthesised beams to a number of uplink UEs to be served. The apparatus can further comprise means to instantiate uplink signal processing per synthesised beam. The apparatus can further comprise means to configure the space between two beams to be smaller than half the channel angular spreading.

According to an example, there is provided an antenna comprising multiple radiating elements and a processing chain configured to supply a signal to, in the downlink, or receive a signal from, in the uplink, respective ones of the radiating elements, wherein the processing chain is configured to modify a number of uplink or downlink information streams, each information stream corresponding to an element in a space sampling basis, by, in the downlink, configuring the space sampling basis to use a radiating element for each information stream, and, in the uplink, configuring the space sampling basis to provide a composite antenna derived from multiple radiating elements to form a synthesised beam. The processing chain can match the number of synthesised beams to a number of uplink UEs to be served.

According to an example, there is provided a machine-readable storage medium encoded with instructions for decomposing an uplink signal, the instructions executable by a processor of a processing chain in a system to cause the system to configure a space sampling basis to provide a composite antenna derived from multiple radiating elements of the system to form a synthesised beam. The machine-readable storage medium can further be encoded with instructions to instantiate uplink signal processing per synthesised beam. The machine-readable storage medium can further be encoded with instructions to configure the space between two beams to be smaller than half the channel angular spreading.

BRIEF DESCRIPTION OF THE DRAWINGS

Embodiments will now be described, by way of example only, with reference to the accompanying drawings, in which.

DESCRIPTION

Examples are described below in sufficient detail to enable those of ordinary skill in the art to embody and implement the systems and processes herein described. It is important to understand that examples can be provided in many alternate forms and should not be construed as limited to the examples set forth herein.

Accordingly, while examples can be modified in various ways and take on various alternative forms, specific examples thereof are shown in the drawings and described in detail below as examples. There is no intent to limit to the particular forms disclosed. On the contrary, all modifications, equivalents, and alternatives falling within the scope of the appended claims should be included. Elements of the examples are consistently denoted by the same reference numerals throughout the drawings and detailed description where appropriate.

The terminology used herein to describe examples is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 1:
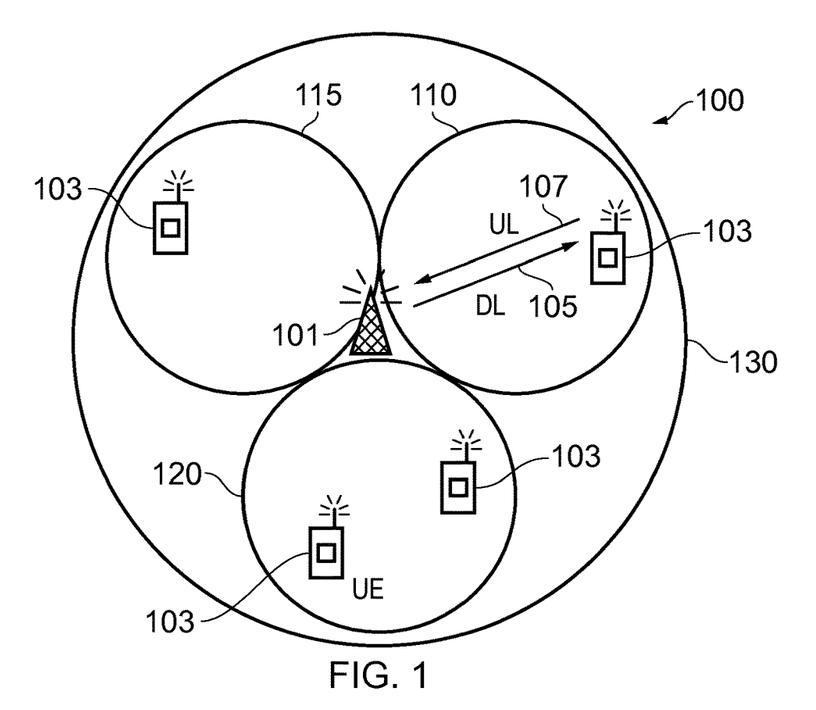
FIG. 1 is a schematic representation of a portion of a wireless telecommunications communications network according to an example.

FIG. 1 is a schematic representation of a portion of a wireless telecommunications communications network according to an example. The network portion 100 includes a base station 101, and one or more target devices 103. The base station 101 can establish a communications link with the devices 103. During a communication session, downlink packets 105 can be received by a target device 103 from the base station 101 and(/or) uplink packets 107 can be sent from the target device over a cellular access interface or access point of the target device 103 to the base station 101. The target device 103 may be user equipment (UE), which may be a mobile telephone for example, which may be engaged in a communication session with a network apparatus forming a session endpoint, such as a server for example. As user equipment are mobile and may also be able to use multiple different access technologies such as LTE, WiFi, 5G and/or Wire on the uplink and/or downlink, it is a bandwidth-intensive operation to maintain connectivity with the many different user equipment.

As shown in FIG. 1, the base station 101 may serve a number of notional sub-cells 110, 115, 120 that are spatially segregated from one another within the larger network cell area 130. Each sub-cell may be served by a set of antenna elements at the base station. This can be thought of as space-multiplexing, as multiple UE may be served on the same frequency at the same time in different areas (sub-cells) of the cell 130.

Figure 2:
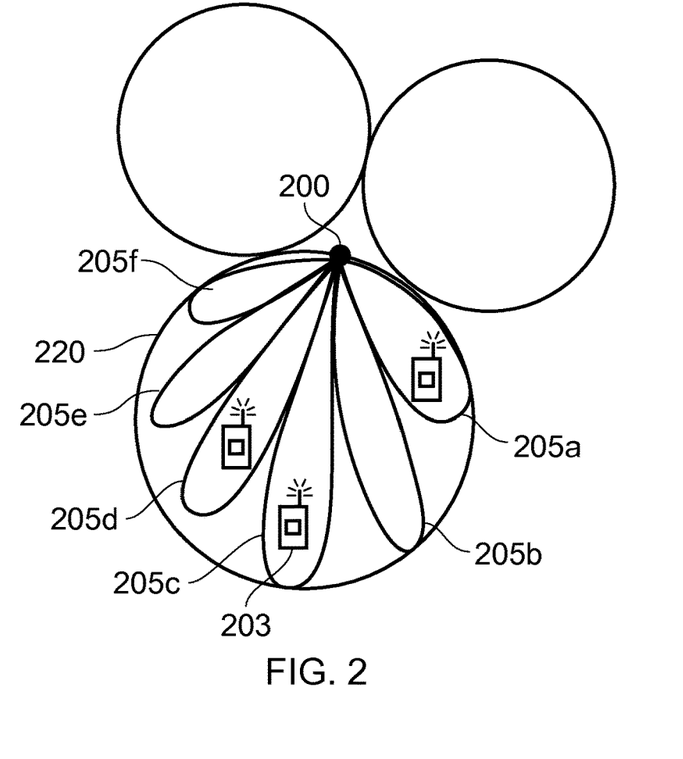
FIG. 2 shows a set of antenna elements used to serve a sub-cell according to an example.

FIG. 2 shows a set of antenna elements 200 used to serve a sub-cell 220 according to an example. One or more target devices 203 may be present in the sub-cell 220. The antenna elements of the base station 101 can be used to beam form multiple spatially separate beams 205a-f, respective ones of which can be used to serve UE within the sub-cell.

Figure 3:
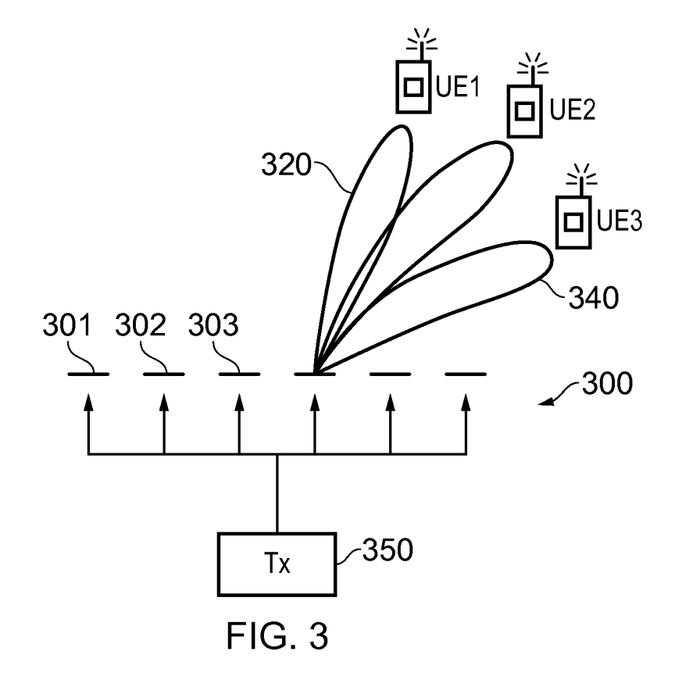
FIG. 3 is a schematic representation an antenna according to an example.

As shown in FIG. 3, an antenna 300 comprises a plurality of individual radiating elements or patches 301, 302, 303 according to an example. Each patch or a combination of multiple patches can be used to generate a beam with a main lobe directed in a selected orientation relative to the antenna. Accordingly, the antenna 300 can be used in the uplink and downlink with multiple UEs that are spatially separated within a sub-cell. This provides an additional degree of freedom to frequency and time multiplexing since the antenna elements can be used to spatially discriminate between UEs thereby enabling frequency reuse over different portions of space. Although only one Tx chain 350 is depicted in FIG. 3 for the sake of clarity, there will be one per antenna element.

Figure 4:
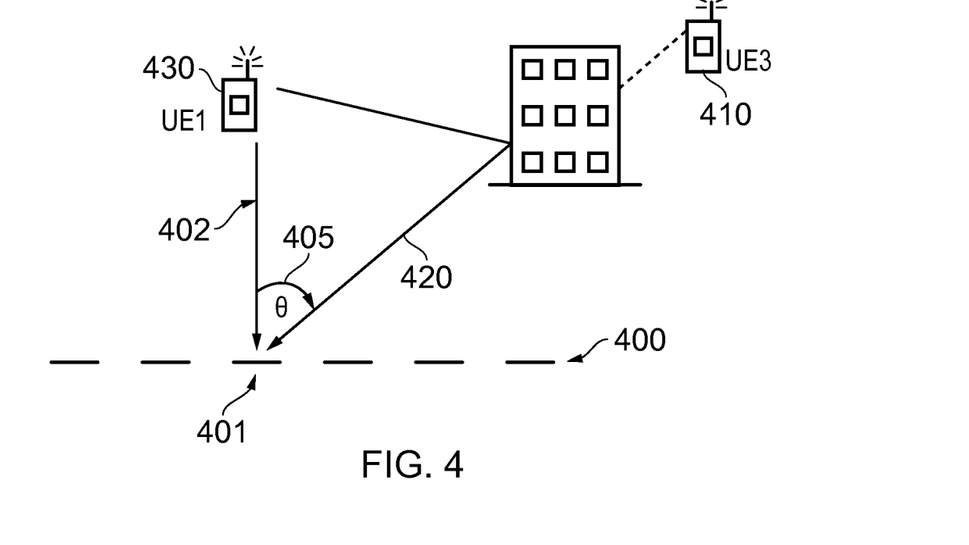
FIG. 4 is a schematic representation depicting the effect of environmental reflections according to an example.

FIG. 4 is a schematic representation depicting the effect of environmental reflections according to an example. As shown in FIG. 4, UEI transmits a signal 402 in the uplink that is received by an element 401 of antenna 400. However, a signal 420 from UEI is reflected from a building (for example) and arrives at antenna 400 at an angle 405 compared to signal 402. For UEI, consider that the antenna 400 uses a sub-set of elements in the uplink with a relatively narrow main lobe to detect signals such that signal 402 is received but signal 420 is not as it falls outside of the area of sensitivity. Instead, the antenna may map signal 420 to UE3, 410.

That is, in order to receive an uplink signal from a target UE, an antenna can utilize a wide-angled beam pattern with a large angular spread to "catch" receiving beam paths from target UEs. However, each beam-lobe may fail to detect a UE due to multiple reflections which may arrive at a significantly different angle from the UE. Accordingly, the antenna may incorrectly determine a signal as originating from a different device due to environmental factors.

Therefore, angular spread due to multipath issues means that fewer UEs can be served. Furthermore, since complex processing has to be performed for each element, having many elements in use in the uplink means that, for example, FFT processing which is a computationally intensive operation must be performed multiple times.

According to an example, a system minimizes the amount of processing required in the uplink by leveraging the fact that spatial resolution is lower than a theoretical maximum due to multipath signal reflections. Thus, complexity due to FTT/iFFT processing can be reduced by decomposing each arrival signal on an orthogonal—or quasi orthogonal basis. This basis can be adapted to the space channel size (antenna overall size permitting). In an example, the number of streams can be expanded to the number of antenna elements.

Figure 5:
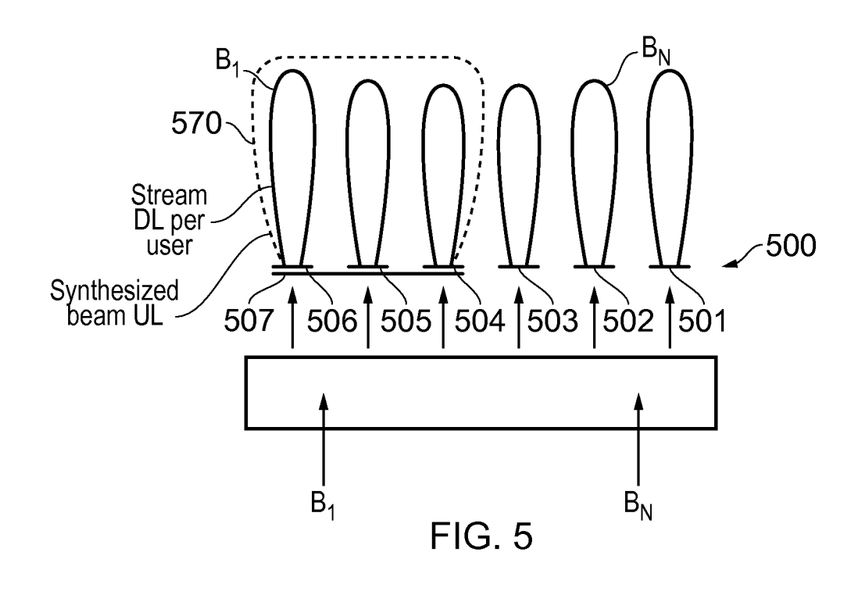
FIG. 5 is a schematic representation of an antenna comprising N elements according to an example.

As shown in FIG. 5, an antenna 500 may comprise N elements 501-506. Thus, during a downlink session the number of beams emitted by the antenna may equal the number of elements (in fact the maximum number of beams can only be <the number of antenna elements). That is, each element may contribute to emission of a beam which is a linear combination in phase and amplitude of multiple input signals, $B_f$-$B_N$.

According to an example, during an uplink session, a collection of multiple radiating elements may be combined to form a composite antenna. The composite antenna may form a synthesized beam. This can be achieved using beam forming for example, in which the radiating elements forming the composite antenna are operated to generate signals at particular angles so that constructive and destructive interference operates to form a beam with a desired spatial profile. Beamforming can be used at both the transmitting and receiving ends in order to achieve such spatial selectivity.

Figure 6:
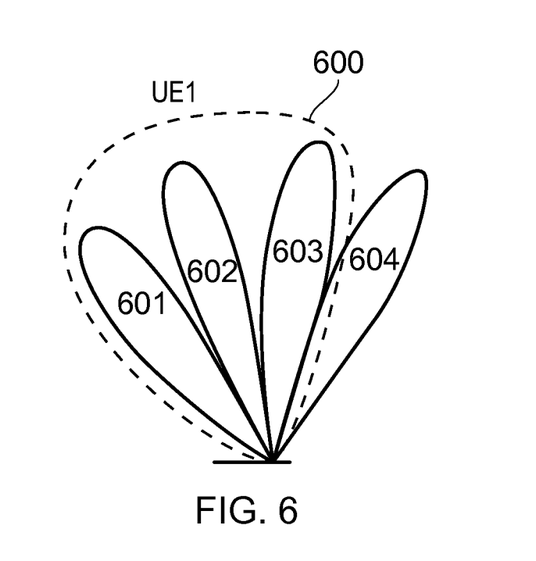
FIG. 6 is a schematic representation of formation of a synthesized beam according to an example.

FIG. 6 is a schematic representation of formation of a synthesized beam according to an example. Multiple antenna elements (not shown) that will typically form multiple narrow beams 601-604 can be used to generate one larger synthesized beam 600. The multiple elements may or may not be adjacent one another. In an example, there are fewer composite antennas than the number of individual antenna elements. A synthesized beam 600 has a broader angular spread for channel reception. Also, reduction in the number of beams in use reduces the number of FFT/iFFT computations needed in the frequency domain, especially in OFDM based cellular systems like Wifi, LTE & 5G.

Thus, in an example, a number of uplink or downlink information streams is modified. Each information stream corresponds to an element in a space sampling basis for the system, wherein, in the downlink, the space sampling basis is configured so that the number of information streams is the same as the number of radiating elements of the system, and in the uplink, the space sampling basis is configured using a composite antenna derived from multiple radiating elements of the system to form a synthesised beam. That is, in the uplink, which is multipath sensitive, the number of antenna elements is effectively reduced so as to provide a larger composite antenna beam.

As shown in FIG. 6 and referring to FIG. 4, UEI may transmit signals in the uplink with a large angular spread. In the case that a larger number of narrower beams (e.g. one for each antenna element) is used, these signals may not be detectable in a multipath system. A synthesised beam 600 has a larger angular spread, and will not suffer from the same issue as it will collect energy arriving from a larger spatial angle. Note that this angle may be just defined in one azimuth or elevation dimension or in a combination of both dimensions depending on the propagation channel characteristics around the installed base station.

Figure 7:
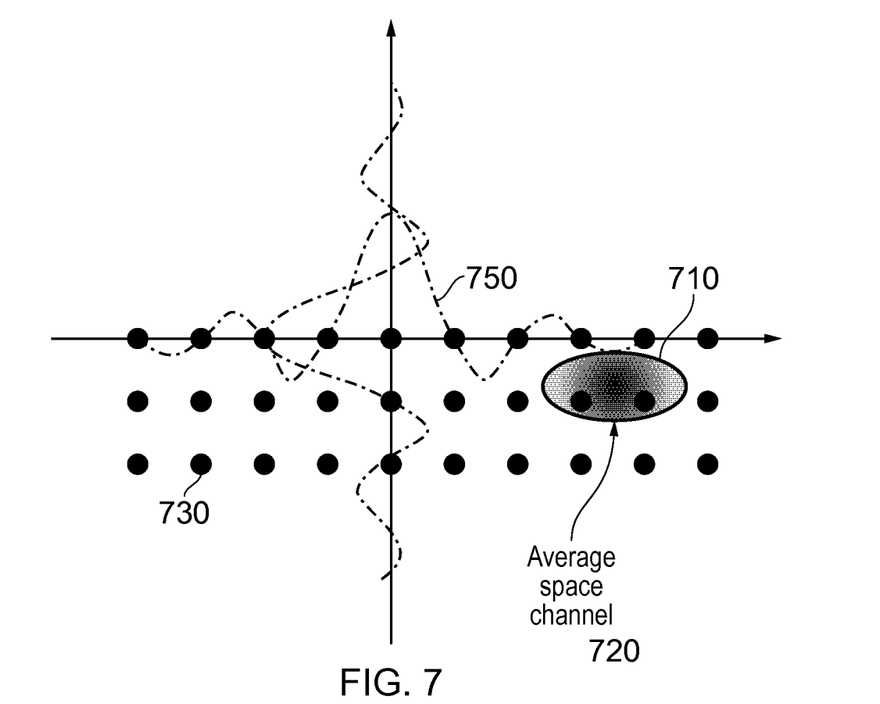
FIG. 7 is a schematic representation of a space sampling basis according to an example.

FIG. 7 is a schematic representation of a space sampling basis according to an example. In FIG. 7, a grid of beams is synthetized with an existing set of radiating elements to get a basis of space and angular sampling of the zone covered by the base station antenna array. FIG. 7 shows the channel spatial dispersion effect 710 is larger than the chosen spatial resolution 720 in each azimuth and elevation dimension and a user in a given direction with a given channel will correspond in the uplink at LI high input as a stream made of weighted sum frequency domain signals from a few adjacent horizontal and vertical elements 830 of the spatial grid.

In an example, the grid is optimized to fit with the channel 850, i.e. the space between two beams is smaller than half the channel angular spreading. Every signal (forward or return) is decomposed on this basis. This grid is done a priori, and can eventually be adapted using long term observations. It behaves as different composite antennas. Once this is done the processing architecture remains the same, but simply on a smaller number of antennas, each representing a portion of the sector covered by the antenna array at a given time.

The basis can be constructed either on a strictly orthogonal set of functions (e.g. sin(x)/x type), either considering the antenna performances at high scanning angle. Tapering (i.e. weighting in amplitude each element) can be used to minimize inter-beam interference. Therefore, this flexible space sampling minimizes the number of beams composing the space sampling.

Figure 8A:
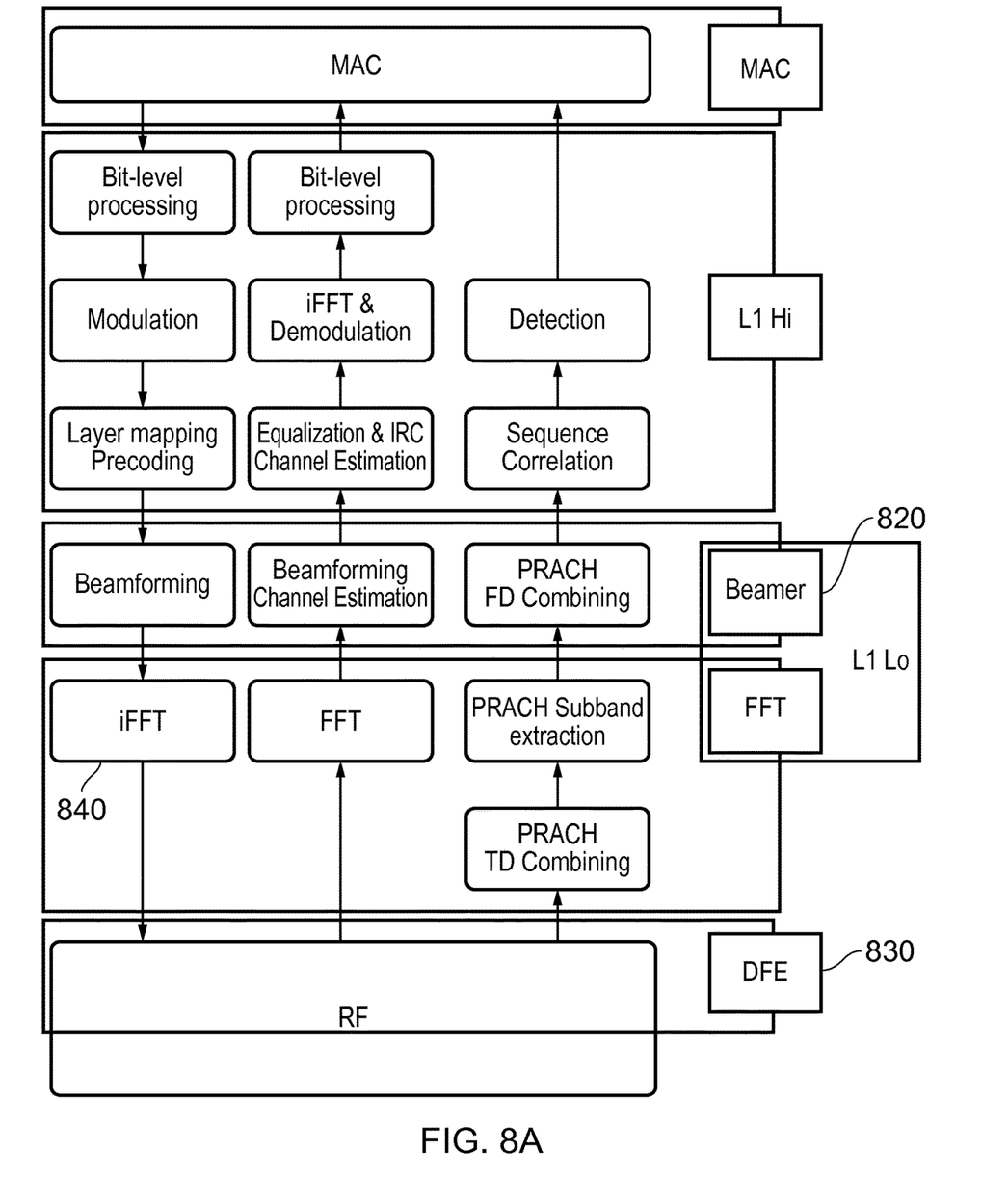
FIGS. 8A and 8B show a massive MIMO architecture according to an example.
Figure 8B:
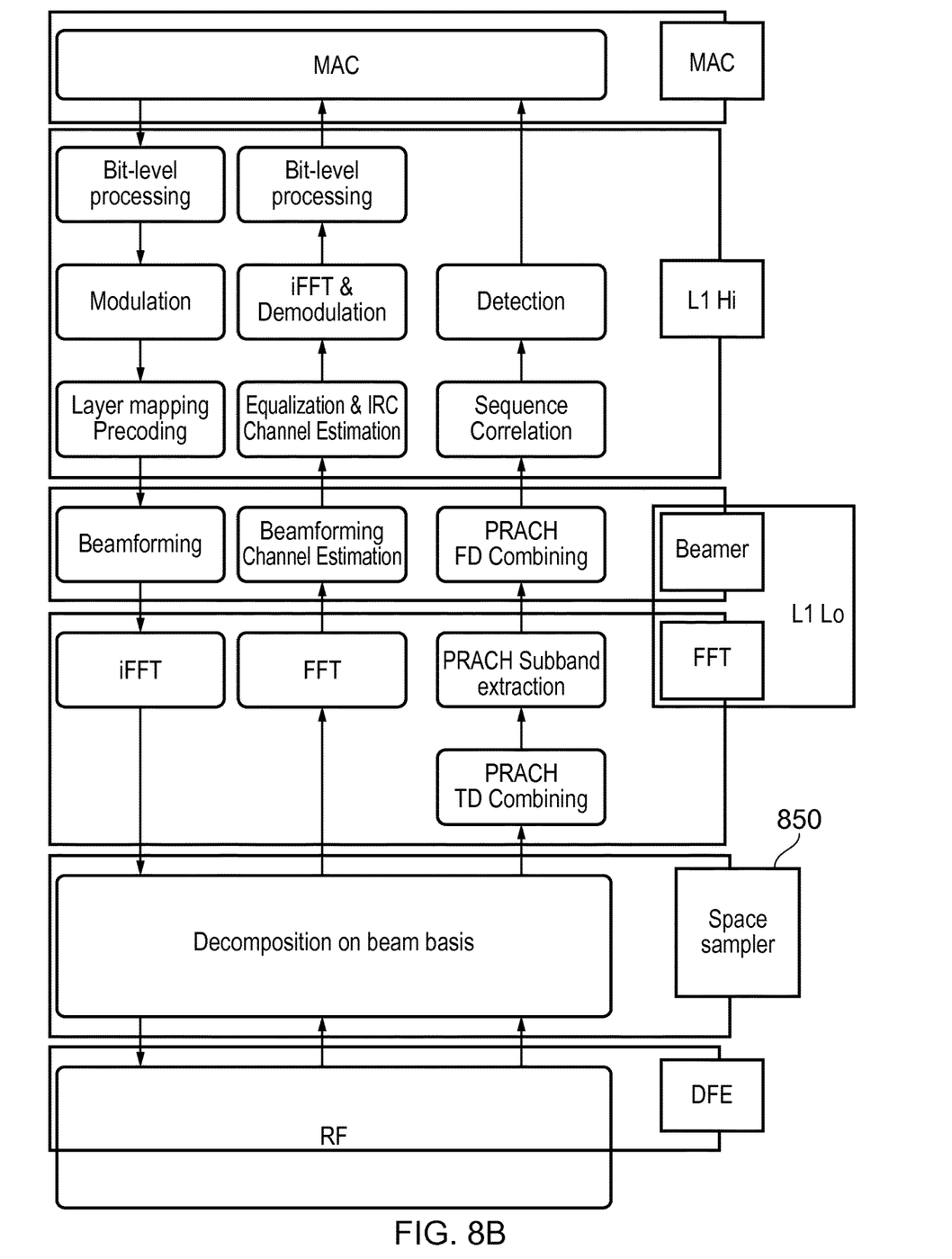

FIGS. 8A and 8B show a massive MIMO architecture according to an example. As shown by the example of FIG. 8B, there is inserted in massive mMIMO uplink (UL) and downlink (DL) processing an additional processing sublayer 850 that reduces (in the UL) or expands (in the DL) the number of dataflows, namely in the DL expanding number of streams to the number of antenna elements and in the UL the reverse—reducing the number of antenna elements to the number of streams, each stream of information corresponding to one element of the space sampling basis.

The space sampler 850 is a card or component or part of a card or component added just after (or before) DFE (digital front end) 830. It performs weighted linear combinations in the uplink with N inputs and P outputs (N is the number of radiating elements, P is the number of simultaneous beams created) and vice versa for the downlink. The space sampler is inserted between UL/DL DFE 830 and the I/FFT 840 which is instantiated now per stream or beam instead of per antenna radiating element as previously. To be more precise there is also an induced simplification in the beamer 820 above the I/FFT block (inside LI LO block). The beamer is simplified as it is a simple kind of mapper where a beam for a user is one stream or a weighted collection of few adjacent streams. The space sampler 850 as such is a space processing operation in time where the I/FFT 840 operates in the time/frequency domain independently for each stream (i.e. for each space point independently). In an example, the space sampler can execute instructions from a machine-readable storage medium, which can be in the form a logic circuit or removable solid state storage medium for example.

Accordingly, an apparatus comprising an antenna with multiple radiating elements can include means to supply a signal to, in the downlink, or receive a signal from, in the uplink, respective ones of the radiating elements and means to modify a number of uplink or downlink information streams, each information stream corresponding to an element in a space sampling basis, by, in the downlink, configuring the space sampling basis to use a radiating element for each information stream, and, in the uplink, configuring the space sampling basis to provide a composite antenna derived from multiple radiating elements to form a synthesised beam. In an example, the means can be a processing chain with a processing sublayer 850 that, as noted above, reduces the number of dataflows (in the UL) or expands the number of dataflows (in the DL) so that, in the DL the number of streams is expanded to the same number as the number of antenna elements and in the UL the reverse. i.e. the number of antenna elements is reduced to mirror the number of streams, each stream of information corresponding to one element of the space sampling basis. In an example, the number of antenna elements can be reduced by forming a composite element composed from multiple individual elements. The means can thus be used to match the number of synthesised beams to a number of uplink UEs to be served.

Minimizing the cost of mMIMO antenna and processing, and keeping the current macro grid means many more radiating elements (e.g. 256 instead of 64). Processing complexity and associated dissipation are growing significantly with the current architecture. For instance, 8×8 panel can sample a 90° sector space (+/−45° H+/−7.5° V) with 16 samples (2×8).

A 16×16 panel can sample a 120° sector space with:
16×2=32 beams without tapering
10×2=20 beams with tapering If the horizontal spreading is 40°, this corresponds to an oversampling >6 w/o tapering and to 4 with. If the vertical spreading is 20°, the oversampling is >3 w/o tapering and 2 with. Consequently, this keeps processing complexity at a minimum. As re-construction of the signal can be achieved with significant accuracy, one can expect quasi optimal performances, the difference being related to minor inaccuracies.

As an example focused on the DL and iFFT processing: in a legacy case with 256 antennas there would need to be 256 IFFT operations per OFDM symbol (in a 4G or 5G application). With the above space sampler system, there would be 32 iFFT operations of the same length at the same speed without tapering (only 20 with tapering). In the same way, also in the DL, the beamer would be reduced for each active user from a 256 point weighting operation to a 2 point weighting operation (user channel made of 2 adjacent space points). In the UL: FFT numbers per received symbol commonly of all users is maximum 32 against 256 in the legacy case and beamer per UL active user is just a 2 space points linear combination.

Figure 9A:
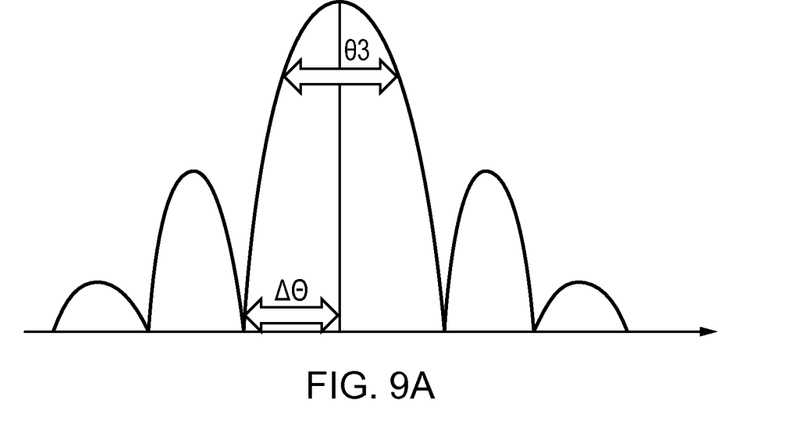
FIGS. 9A and 9B show the 3θ and ΔΘ definitions and a 3 dB aperture and lobe aperture (between zeros) according to an example.
Figure 9B:
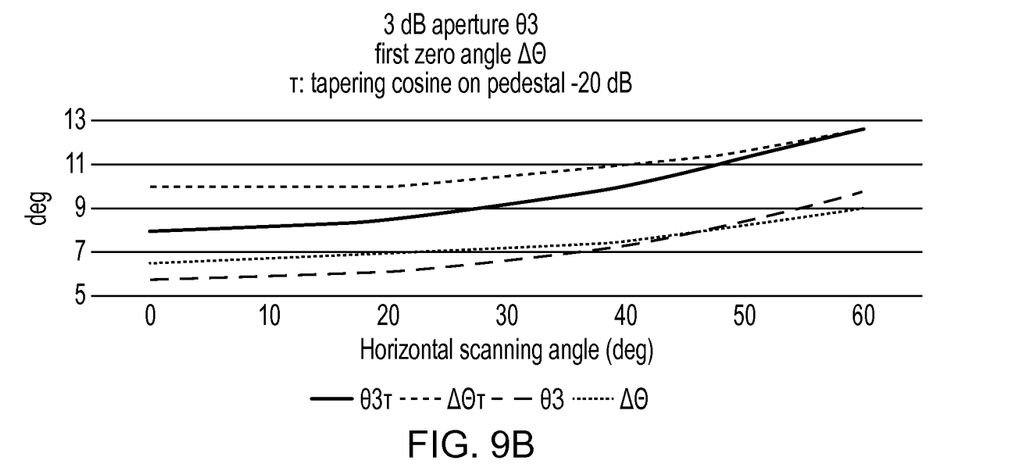

FIG. 9A shows the 3θ and ΔΘ definitions and FIG. 9B shows a 3 dB aperture and lobe aperture (between zeros) according to an example. FIG. 9B highlights the fact that for beams further from the boresight direction, either in azimuth or elevation, the elementary beam width increases and for a given antenna array cannot be shrunk by any means, this is an unavoidable loss of angular resolution.

So, it would be suboptimal to try to have a too fine a grain in the azimuth or elevation at large tilt angles. Thus, according to an example, beams are adapted on a pseudo orthogonal basis according to this physical limitation as well as according to the tapering (if used) which acts in a similar way to further enlarge each beam (natural loss of space resolution is the price to pay for better pseudo orthogonality between those spatial basis elements).

As described above, space sampling is performed digitally on UL and DL digital samples of each antenna signal. A variant to further decrease digital HW associated processing is to construct the pseudo orthogonal basis (the space sampler) using RF analog processing while doing the same linear weighted combinations (UL) or weighted signal distribution and summing (DL) as in digital. With state of the art RF passive circuits this can be done with an array CFN (corporate feed network) made with RF striplines, asymmetric splitters and combiners on an RF PCB or suspended lines technology depending on frequency bands to handle for example.

Examples can be embodied in other specific apparatus and/or methods. The described examples are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a base station of a wireless telecommunications system comprising multiple radiating elements, the method comprising:
modifying a number of uplink or downlink information streams, a respective information stream corresponding to an element in a space sampling basis for the system, wherein, in the downlink, the space sampling basis is configured so that the number of information streams is the same as the number of radiating elements of the system, and wherein, in the uplink, an uplink signal is decomposed on an orthogonal or quasi-orthogonal basis, the orthogonal or quasi-orthogonal basis being adapted to an uplink space channel size for a user equipment (UE), and the space sampling basis is configured using a composite antenna derived from multiple radiating elements of the system to form a synthesized beam.

2. A method as claimed in claim 1, further comprising matching the synthesized beam to an uplink space channel size for the UE, whereby to enable decomposition of an uplink signal from the UE using the synthesized beam.

3. A method as claimed in claim 1, further comprising forming multiple synthesized beams.

4. A method as claimed in claim 3, where the number of synthesized beam is configured to match the number of uplink UEs served by the system.

5. A method as claimed in claim 3, wherein the space between two beams is smaller than half the channel angular spreading.

6. A method as claimed in claim 1, further comprising instantiating uplink signal processing per synthesized beam.

7. A method as claimed in claim 1, wherein the system is a Multiple-Input Multiple-Output, MIMO system.

8. Apparatus comprising an antenna comprising multiple radiating elements, the apparatus further comprising a processor configured to:
   supply a signal to, in the downlink, or receive a signal from, in the uplink, respective ones of the radiating elements; and
   modify a number of uplink or downlink information streams, a respective information stream corresponding to an element in a space sampling basis, by, in the downlink, configuring the space sampling basis to use a radiating element for a respective information stream, and, in the uplink, decomposing an uplink signal on an orthogonal or quasi-orthogonal basis, adapting the orthogonal or quasi-orthogonal basis to an uplink space channel size for a user equipment (UE), and configuring the space sampling basis to provide a composite antenna derived from multiple radiating elements to form a synthesized beam.

9. Apparatus as claimed in claim 8, further configured to match the number of synthesized beams to a number of uplink UEs to be served.

10. Apparatus as claimed in claim 8, further configured to instantiate uplink signal processing per synthesized beam.

11. Apparatus as claimed in claim 8, further configured to configure the space between two beams to be smaller than half the channel angular spreading.

12. An apparatus as claimed in claim 8 wherein the apparatus is a base station of a wireless telecommunications systems.

13. An apparatus as claimed in claim 8, wherein the processer is configured to match the synthesized beam to an uplink space channel size for the UE, UE, whereby to enable decomposition of an uplink signal from the UE using the synthesized beam.

14. An apparatus as claimed in claim 8, wherein the processor is configured to form multiple synthesized beams.

15. An apparatus as claimed in claim 8 wherein the apparatus is an antenna.

16. An apparatus as claimed in claim 8 wherein the processor is configured to match the number of synthesized beams to a number of uplink UEs to be served.

17. A non-transitory machine-readable storage medium encoded with instructions for decomposing an uplink signal, the instructions executable by a processor of a processing chain in a system to cause the system to:
   configure a space sampling basis to provide a composite antenna derived from multiple radiating elements of the system to form a synthesized beam,
   wherein the uplink signal is decomposed on an orthogonal or quasi-orthogonal basis and the orthogonal or quasi-orthogonal basis is adapted to an uplink space channel size for a user equipment (UE), and the space sampling basis is configured using a composite antenna derived from multiple radiating elements of the system to form a synthesized beam.

18. A non-transitory machine-readable storage medium as claimed in claim 17, further encoded with instructions to instantiate uplink signal processing per synthesized beam.

19. A non-transitory machine-readable storage medium as claimed in claim 17, further encoded with instructions to configure the space between two beams to be smaller than half the channel angular spreading.

* * * * *

UNITED STATES PATENT AND TRADEMARK OFFICE
CERTIFICATE OF CORRECTION

PATENT NO. : 11,706,765 B2
APPLICATION NO. : 16/757011
DATED : July 18, 2023
INVENTOR(S) : Luc Dartois et al.

Page 1 of 1

It is certified that error appears in the above-identified patent and that said Letters Patent is hereby corrected as shown below:

In the Claims

In Column 10, Line 1, Claim 13, delete "UE, UE," and insert -- UE, --, therefor.

Signed and Sealed this
Thirteenth Day of February, 2024

Katherine Kelly Vidal
*Director of the United States Patent and Trademark Office*